United States Patent
Jonsson (10) Patent No.: US 9,649,000 B2
(45) Date of Patent: May 16, 2017

(54) CYCLONE DUST SEPARATOR ARRANGEMENT, CYCLONE DUST SEPARATOR AND CYCLONE VACUUM CLEANER

(71) Applicant: Aktiebolaget Electrolux, Stockholm (SE)

(72) Inventor: Stefan Jonsson, Stockholm (SE)

(73) Assignee: Aktiebolaget Electrolux (SE)

( * ) Notice: Subject to any disclaimer, the term of this patent is extended or adjusted under 35 U.S.C. 154(b) by 81 days.

(21) Appl. No.: 14/441,643

(22) PCT Filed: Nov. 8, 2013

(86) PCT No.: PCT/EP2013/073391
§ 371 (c)(1),
(2) Date: May 8, 2015

(87) PCT Pub. No.: WO2014/072469
PCT Pub. Date: May 15, 2014

(65) Prior Publication Data
US 2015/0305583 A1    Oct. 29, 2015

(30) Foreign Application Priority Data

Nov. 9, 2012   (SE) ..................... 1200687

(51) Int. Cl.
*A47L 9/16*    (2006.01)
*B04C 3/04*    (2006.01)
(Continued)

(52) U.S. Cl.
CPC ............ *A47L 9/1641* (2013.01); *A47L 9/165* (2013.01); *A47L 9/1666* (2013.01);
(Continued)

(58) Field of Classification Search
CPC ........ B01D 45/08; B01D 45/16; B01D 46/48; A47L 9/1641; A47L 9/165; A47L 9/1683; B04C 3/04; B04C 5/04; B04C 5/28
(Continued)

(56) References Cited

U.S. PATENT DOCUMENTS

| 458,773 A | 9/1891 | Lee | |
|---|---|---|---|
| 535,099 A * | 3/1895 | Gale et al. | ............... B07B 7/06 209/22 |

(Continued)

FOREIGN PATENT DOCUMENTS

| AU | 7763681 | 5/1983 |
|---|---|---|
| CN | 101039755 | 9/2007 |

(Continued)

OTHER PUBLICATIONS

International Search Report for International Application No. PCT/EP2013/073391 mailed Jan. 29, 2014.

(Continued)

*Primary Examiner* — Jason M Greene
(74) *Attorney, Agent, or Firm* — RatnerPrestia (57) ABSTRACT

A cyclone dust separator arrangement having a first dust separating cyclone and a second dust separating cyclone. Respective air inlets of the first and second dust separating cyclones are connected in parallel to a common air supply channel. The common air supply channel includes an inertia particle separator implemented upstream of the air inlets.

14 Claims, 3 Drawing Sheets

(51) Int. Cl.
  *B01D 46/48* (2006.01)
  *B01D 50/00* (2006.01)
  *B01D 45/08* (2006.01)
  *B01D 45/16* (2006.01)
  *B04C 5/04* (2006.01)
  *B04C 5/28* (2006.01)
(52) U.S. Cl.
  CPC ............ *A47L 9/1683* (2013.01); *B01D 45/08* (2013.01); *B01D 45/16* (2013.01); *B01D 46/48* (2013.01); *B01D 50/002* (2013.01); *B04C 3/04* (2013.01); *B04C 5/04* (2013.01); *B04C 5/28* (2013.01)
(58) Field of Classification Search
  USPC ........................... 55/315, 318, 346, 349, 461
  See application file for complete search history.

(56) References Cited

U.S. PATENT DOCUMENTS

| | | |
|---|---|---|
| 941,675 A | 11/1909 | Green |
| 963,139 A | 7/1910 | Griffiths |
| 1,029,562 A | 6/1912 | Prentiss |
| 1,133,543 A | 3/1915 | Duffie |
| 1,507,271 A | 9/1924 | Bennett |
| 1,508,315 A | 9/1924 | Brockway |
| 1,565,318 A | 12/1925 | Fisher |
| 1,871,111 A | 8/1932 | Campbell |
| 2,118,167 A | 5/1938 | Connor |
| 2,193,479 A | 3/1940 | Donaldson |
| 2,375,608 A | 5/1945 | Young |
| 2,482,166 A | 9/1949 | Gage |
| 2,934,494 A | 4/1960 | Kleiber |
| 3,543,325 A | 12/1970 | Hamrick |
| 3,568,847 A | 3/1971 | Carr |
| 3,626,545 A | 12/1971 | Sparrow |
| 3,853,518 A | 12/1974 | Brooke |
| 3,865,242 A * | 2/1975 | Musto ................. B04C 5/02 209/143 |
| 4,108,778 A | 8/1978 | Lambert |
| 4,157,903 A * | 6/1979 | Kanda ................. B01D 45/16 118/600 |
| 4,287,719 A * | 9/1981 | Students ............. A23L 3/364 55/461 |
| 4,375,365 A * | 3/1983 | Muller ................ B01D 45/12 209/723 |
| 4,556,541 A * | 12/1985 | Gartside ............. B01J 8/003 422/144 |
| 4,593,429 A | 6/1986 | Dyson |
| 4,601,082 A | 7/1986 | Kurz |
| 4,678,588 A | 7/1987 | Shortt |
| 4,680,827 A | 7/1987 | Hummel |
| RE32,751 E | 9/1988 | Joss |
| 4,769,535 A | 9/1988 | Sasaki |
| 4,853,008 A | 8/1989 | Dyson |
| 4,920,605 A | 5/1990 | Takashima |
| 4,937,912 A | 7/1990 | Kurz |
| 4,942,640 A | 7/1990 | Hayashi |
| 4,944,780 A | 7/1990 | Usmani |
| 4,967,443 A | 11/1990 | Krasznai |
| 4,971,604 A * | 11/1990 | Dockrell ............. B01D 45/12 55/461 |
| 5,020,187 A | 6/1991 | Kosten |
| 5,078,761 A | 1/1992 | Dyson |
| 5,080,697 A | 1/1992 | Finke |
| 5,106,488 A | 4/1992 | Jonasson |
| 5,134,749 A | 8/1992 | Sakurai |
| 5,135,552 A | 8/1992 | Weistra |
| 5,144,714 A | 9/1992 | Mori |
| 5,144,715 A | 9/1992 | Matsuyo |
| 5,152,028 A | 10/1992 | Hirano |
| 5,160,356 A | 11/1992 | Dyson |
| 5,163,202 A | 11/1992 | Kawakami |
| 5,182,833 A | 2/1993 | Yamaguchi |
| 5,216,777 A | 6/1993 | Moro |
| 5,230,722 A | 7/1993 | Yonkers |
| 5,233,682 A | 8/1993 | Abe |
| 5,248,323 A | 9/1993 | Stevenson |
| 5,251,358 A | 10/1993 | Moro |
| 5,287,591 A | 2/1994 | Rench |
| 5,307,538 A | 5/1994 | Rench |
| 5,319,827 A | 6/1994 | Yang |
| 5,323,483 A | 6/1994 | Baeg |
| 5,350,432 A | 9/1994 | Lee |
| 5,515,572 A | 5/1996 | Hoekstra |
| 5,539,953 A | 7/1996 | Kurz |
| 5,542,146 A | 8/1996 | Hoekstra |
| 5,613,261 A | 3/1997 | Kawakami |
| 5,725,623 A | 3/1998 | Bowerman |
| 5,750,022 A | 5/1998 | Blake |
| 5,779,745 A | 7/1998 | Kilstrom |
| 5,815,884 A | 10/1998 | Imamura |
| 5,819,367 A | 10/1998 | Imamura |
| 5,840,103 A | 11/1998 | Dyson |
| 5,853,440 A | 12/1998 | Dyson |
| 5,858,038 A | 1/1999 | Dyson |
| 5,893,936 A | 4/1999 | Dyson |
| 5,914,416 A | 6/1999 | Thode |
| 5,935,279 A | 8/1999 | Kilstrom |
| 5,950,274 A | 9/1999 | Kilstrom |
| 6,003,196 A | 12/1999 | Wright |
| 6,023,814 A | 2/2000 | Imamura |
| 6,026,540 A | 2/2000 | Wright |
| 6,055,702 A | 5/2000 | Imamura |
| 6,070,291 A | 6/2000 | Bair |
| 6,085,382 A | 7/2000 | Bobrosky |
| 6,141,826 A | 11/2000 | Conrad |
| 6,192,550 B1 | 2/2001 | Hamada |
| 6,238,451 B1 | 5/2001 | Conrad |
| 6,260,234 B1 | 7/2001 | Wright |
| 6,269,518 B1 | 8/2001 | Yung |
| 6,323,570 B1 | 11/2001 | Nishimura |
| 6,332,239 B1 | 12/2001 | Dubos |
| 6,334,234 B1 | 1/2002 | Conrad |
| 6,341,404 B1 | 1/2002 | Salo |
| 6,350,292 B1 | 2/2002 | Lee |
| 6,375,696 B2 | 4/2002 | Wegelin |
| 6,385,910 B1 | 5/2002 | Smink |
| 6,400,048 B1 | 6/2002 | Nishimura |
| 6,406,505 B1 | 6/2002 | Oh |
| 6,428,589 B1 | 8/2002 | Bair |
| 6,436,160 B1 | 8/2002 | Stephens |
| 6,437,465 B1 | 8/2002 | Nishimura |
| 6,558,453 B2 | 5/2003 | Sepke |
| 6,589,309 B2 | 7/2003 | Oh |
| 6,596,045 B2 | 7/2003 | Qian |
| 6,640,385 B2 | 11/2003 | Oh |
| 6,732,406 B2 | 5/2004 | Oh |
| 6,735,816 B2 | 5/2004 | Oh |
| 6,735,818 B2 | 5/2004 | Hamada |
| 6,757,933 B2 | 7/2004 | Oh |
| 6,782,584 B2 | 8/2004 | Choi |
| 6,818,032 B2 | 11/2004 | Bilek |
| 6,829,804 B2 | 12/2004 | Sepke |
| 6,836,931 B2 | 1/2005 | Bone |
| 6,910,245 B2 | 6/2005 | Hawkins |
| 6,922,868 B1 | 8/2005 | Jeong |
| 6,991,667 B2 | 1/2006 | Yang |
| 7,055,211 B2 | 6/2006 | Tucker |
| 7,152,274 B2 | 12/2006 | Alford |
| 7,155,772 B2 | 1/2007 | Lee |
| 7,162,770 B2 | 1/2007 | Davidshofer |
| 7,191,490 B2 | 3/2007 | Lee |
| 7,201,786 B2 | 4/2007 | Wegelin |
| 7,381,233 B2 | 6/2008 | Oh |
| 7,381,234 B2 | 6/2008 | Oh |
| 7,544,224 B2 | 6/2009 | Tanner |
| 7,662,201 B2 | 2/2010 | Lee |
| 7,931,722 B2 | 4/2011 | Sepke |
| 7,941,895 B2 | 5/2011 | Conrad |
| 7,951,214 B2 | 5/2011 | Menrik |
| 8,448,292 B2 | 5/2013 | Miefalk |
| 8,875,343 B2 | 11/2014 | Hedlund |

(56) References Cited

U.S. PATENT DOCUMENTS

| | | |
|---|---|---|
| 9,015,897 B2 | 4/2015 | Jonsson |
| 2002/0029436 A1 | 3/2002 | Hawkins |
| 2004/0074213 A1 | 4/2004 | Organ |
| 2004/0177467 A1 | 9/2004 | Jones |
| 2004/0261216 A1 | 12/2004 | Choi |
| 2005/0137863 A1 | 6/2005 | Jasiuk |
| 2005/0138760 A1 | 6/2005 | Park |
| 2005/0138761 A1 | 6/2005 | Park |
| 2005/0138763 A1 | 6/2005 | Tanner |
| 2005/0229554 A1* | 10/2005 | Oh .................. A47L 9/1641 55/346 |
| 2005/0251951 A1* | 11/2005 | Oh .................. A47L 9/1683 15/353 |
| 2006/0117520 A1 | 6/2006 | Choi |
| 2006/0123589 A1 | 6/2006 | Kim |
| 2006/0272299 A1 | 12/2006 | Choi |
| 2007/0011842 A1 | 1/2007 | Moon |
| 2007/0144116 A1 | 6/2007 | Hong |
| 2007/0180649 A1 | 8/2007 | Pullins |
| 2007/0214597 A1 | 9/2007 | Suzuki |
| 2007/0220845 A1* | 9/2007 | Smith .................. A47L 9/165 55/345 |
| 2008/0047091 A1 | 2/2008 | Nguyen |
| 2009/0193771 A1 | 8/2009 | Oh |
| 2009/0199359 A1 | 8/2009 | Hyun |
| 2009/0205162 A1 | 8/2009 | Oh |
| 2010/0236013 A1 | 9/2010 | Sjoberg |

FOREIGN PATENT DOCUMENTS

| | | |
|---|---|---|
| CN | 101103887 | 1/2008 |
| DE | 3031024 | 4/1982 |
| DE | 4136935 | 5/1993 |
| EP | 0327936 | 8/1989 |
| EP | 0347223 | 12/1989 |
| EP | 0456084 | 11/1991 |
| EP | 0489565 | 6/1992 |
| EP | 0743039 | 11/1996 |
| EP | 1157650 | 11/2001 |
| EP | 0885585 | 4/2002 |
| EP | 1779761 | 5/2007 |
| EP | 1836941 | 9/2007 |
| EP | 1837079 | 9/2007 |
| EP | 0966912 | 3/2010 |
| EP | 1199023 | 3/2010 |
| FR | 1468142 | 2/1967 |
| GB | 2035150 | 9/1923 |
| GB | 229859 | 3/1925 |
| GB | 529692 | 11/1940 |
| GB | 1111074 | 4/1968 |
| GB | 2116457 | 9/1983 |
| GB | 2367512 | 4/2002 |
| GB | 2424605 | 10/2006 |
| GB | 2475313 | 5/2011 |
| JP | 54121568 | 9/1979 |
| JP | 8322769 | 10/1983 |
| JP | 59027758 | 2/1984 |
| JP | 61181430 | 8/1986 |
| JP | 2049621 | 2/1990 |
| JP | 2005261963 | 9/2005 |
| KR | 100354653 | 12/2002 |
| SE | 119307 | 7/1947 |
| SU | 1217487 | 3/1986 |
| WO | 9514422 | 6/1995 |
| WO | 9922873 | 5/1999 |
| WO | 9922874 | 5/1999 |
| WO | 0021428 | 4/2000 |
| WO | 0049932 | 8/2000 |
| WO | 0064321 | 11/2000 |
| WO | 0108544 | 2/2001 |
| WO | 0203844 | 1/2002 |
| WO | 0203845 | 1/2002 |
| WO | 0203846 | 1/2002 |
| WO | 2004026485 | 4/2004 |
| WO | 2004030508 | 4/2004 |
| WO | 2009073888 | 6/2009 |
| WO | 2009138811 | 11/2009 |
| WO | 2012113814 | 8/2012 |

OTHER PUBLICATIONS

"Self Cleaning Bagless" by Panasonic Consumer Electronics, Co. (undated, but admitted to be prior art).
Entire patent prosecution history of U.S. Appl. No. 12/405,742, filed Mar. 17, 2009, entitled, "Vacuum Cleaner Sensor".
Entire patent prosecution history of U.S. Appl. No. 13/807,562, filed Mar. 6, 2013, entitled, "Dust Indicator for a Vacuum Cleaner".
International Search Report for International Application No. PCT/EP2011/060813, mailed Nov. 22, 2011.
International Search Report for PCT International Application No. PCT/EP2011/060814, mailed Nov. 22, 2011.
International Search Report for PCT International Application No. PCT/US2010/027637, mailed May 19, 2010.
International Written Opinion for PCT International Application No. PCT/EP2011/060814. mailed Jan. 8, 2013.
Notice of Termination of Pretrial Reexamination Report with English Translation for Japanese Application No. JP 2012-509759, dated Jul. 1, 2014.
Chinese Office Action for Chinese Application No. 201380058501.9, dated May 4, 2016 with translation, 19 pages.
Swedish Office Action for Swedish Application No. 1200687-0, dated May 20, 2013 with translation, 6 pages.

* cited by examiner

CYCLONE DUST SEPARATOR ARRANGEMENT, CYCLONE DUST SEPARATOR AND CYCLONE VACUUM CLEANER

This application is a U.S. National Phase application of PCT International Application No. PCT/EP2013/073391, filed Nov. 8, 2013, and claims priority to Sweden Patent Application No.: 1200687-0, filed Nov. 9, 2012, the entire disclosures of which are incorporated herein by reference.

FIELD OF THE INVENTION

The present invention is directed to a cyclone dust separator arrangement, cyclone dust separator and cyclone vacuum cleaner.

BACKGROUND OF THE INVENTION

Cyclone type vacuum cleaners are widely known because of their benefit in bagless dust collection. In cyclone type vacuum cleaners, dust is separated in cyclone separators via a cyclone effect. Dust separated in this way is transferred to dust collecting containers.

Dust separating efficiency of cyclone dust separators is still a topic even for known types of cyclone vacuum cleaners. In particular, the higher the separation efficiency of the cyclone separation step or steps, the longer the service life of a main filter, generally provided downstream the cyclone stages.

SUMMARY OF THE INVENTION

Therefore, it is one of the objects of the present invention to solve the inconveniences observed with state of technology. In particular, it is an object of the invention to provide solutions for improving the separation efficiency of vacuum cleaner cyclone units. In particular and under similar aspects, a cyclone dust separator arrangement, a cyclone dust separator and cyclone vacuum cleaner shall be provided.

This object is obtained in particular by various embodiments. Embodiments in particular result from respective dependent claims.

According to one aspect a cyclone dust separator arrangement is provided. The cyclone dust separator arrangement comprises at least one first dust separating cyclone and at least one second dust separating cyclone.

As will be seen further below, the first dust separating cyclone may function or be implemented as a fine dust separating cyclone and the second dust separating cyclone may function or be implemented as a coarse dust separating cyclone.

The terms "fine" and "coarse" may in particular refer to the size, in particular average size, or diameters of dust particles, in particular and typically prevailing in ordinary households. "Fine" shall mean comparatively fine and small dust particles, whereas "coarse" dust particles in contrast shall mean comparatively large dust particles, in particular larger than the fine dust particles or an average value thereof The at least one first dust separating cyclone and at least one second dust separating cyclone respectively comprise an air inlet. An air inlet may be defined as an air inlet opening in an upper, top or head region of a respective cyclone. The air inlet may be of rectangular shape. Further, the air inlet may be designed and implemented such that air enters the cyclone chamber of a respective dust separating cyclone approximately tangentially.

The air inlets of the first and second dust separating cyclones are connected in parallel to a common air supply channel. The term "in parallel" in particular shall mean that the first and second dust separating cyclones are arranged in a conventional parallel connection.

The air supply channel may be implemented as a kind of chamber, in particular as a section of a duct. The air supply channel in general is adapted such that incoming air can be distributed to the separating cyclones.

According to one aspect, it is proposed that the common air supply channel comprises an inertia particle separator implemented upstream of the air inlets of the first and second dust separating cyclones.

The expression "implemented upstream" in particular shall mean that the inertia particle separator is installed to operate in a region or section of the air supply channel situated upstream the air inlets. This means that incoming air first passes, in particular has to pass, the inertia particle separator, and then may pass one of the first and second dust separating cyclones.

An inertia particle separator in the meaning of the present application shall mean a device and/or mechanism that is designed and adapted such that dust particles of different size and/or mass are guided or are caused to move along different paths or trajectories as a consequence of their mass and/or size. It shall be noted, that mass inertia and/or flow inertia may be a cause for different paths or trajectories.

It is preferred, that the general function of the inertia particle separator does not comprise a separating chamber or opening adapted to collect or remove particles of a certain mass and/or size from the airflow. However, such a collecting function may be implemented if constructional space and design so allow.

With the inertia particle separator a type of pre-selection or presorting for the particles and dust particles contained in the incoming airflow can be obtained. The inertia particle separator in connection with the parallel first and second dust separating cyclones may be effective in guiding particles of different sizes and/or mass to different dust separating cyclones, i.e. either to the first dust separating cyclone or to the second dust separating cyclone. Here, the respective dust separating cyclone, in particular cyclone body, can be optimized, in particular in its separating efficiency, to the size, type and/or mass of dust particles that will primarily or most probably pass the cyclone body or separating cyclone.

The inertia particle separator thus loads the first and second dust separating cyclones with different types of dust laden air. For this reason, it may be that the dust separating cyclones are not loaded symmetrically, i.e. in a balanced way. Hence, the dust separating cyclones may be designated as "unbalanced" parallel cyclones.

In all it becomes clear that putting an inertia particle separator as proposed by the invention upstream the dust separating cyclones may lead to enhanced separating efficiency and therefore enhanced cleaning efficiency. One further advantageous effect of the construction as proposed herein is, that the parallel dust separating cyclones are also effective in reducing the pressure drop over a respective cleaning or separating stage of a vacuum cleaner. This in turn may results in a reduction of power required for operating the vacuum cleaner, separating and/or cleaning stage.

The design of the inertia particle separator and the arrangement of the air inlets of the cyclone dust separator arrangement may be adapted such that an average weight or mass of dust particles capable of entering the second dust separating cyclone is greater than an average weight or mass of dust particles capable of entering the first dust separating cyclone. Here, incoming dust particles—in general—are separated in accordance to their weight or mass, which for the most dust particles is correlated or proportional to their volume.

In simple words, dust particles of comparatively high weight or mass will most probably enter the second dust separating cyclone, whereas dust particles of comparatively low weight or mass will most probably enter the first dust separating cyclone. Here it shall be mentioned that the cut-off value for dust particles to enter the first or second dust separating cyclone may—inter alia—depend on respective air-flow conditions, flow geometries of the inertia particle separator, geometries and arrangement of the air inlets and so on.

In designing the inertia dust separator in such a way that the size and/or mass distribution of dust particles passing the first and second dust separating cyclone are different, respective dust separating cyclones, in particular their cyclone bodies, can be adapted to the expected and most probable type of dust particles. Here, a distribution of dust particles observed with average household situations may be used. Adaptations of the dust separating cyclones may be related to diameter, length, shape and/or cross-section of respective cyclone bodies.

It shall be mentioned that the overall airflow through and airflow velocity as well as other parameters may and shall be considered for obtaining a proper mechanical design of respective cyclone bodies, air inlets and/or air supply channels.

In one embodiment, the air the inertia particle separator comprises in an air-inlet region of the air supply channel a bent section. The bent section in particular is shaped, in particular bent in such a way, that incoming dust particles are deflected towards the air inlets of the first and second dust separating cyclones. With this embodiment, the air supply channels of the first and second dust separating cyclones are situated downstream the bent section. It is preferred that the air inlets of the first and second dust separating cyclones are arranged or positioned successively, i.e. that respective air inlets are positioned or situated in successive order. This in particular shall mean that the air inlet of the first dust separating cyclone is closer, in particular in terms of dust particle trajectories, to the inertia particle separator than the air inlet of the second dust separating cyclone.

Using a bent section, in particular a tubular bend or conduit bend, has been proven to be an operational effective and constructional simple way to implement a separator for different types of dust particles, in particular dust particles of different weight or mass and/or size.

The bent section may in particular be implemented as an eighth circle, quarter-circle or half-circle shaped segment of the supply channel. However, any curvature ranging from above zero (0) to an eighth (45°), a quarter (90°) or a half-circle (180°) or even more may be used. Note that the bend or bending angle may be selected and optimized to the mass/weight distribution of dust particles expected to pass the cyclone dust separator arrangement.

In one refinement, the bent section of the air supply channel comprises a first wall section with a first bending radius and an opposing second wall section with a larger, second bending radius. In this refinement, the air inlets preferably are located at or on a wall segment of the supply channel arranged downstream and adjacent to the first wall section.

The bent section of the air supply channel could also comprises a first wall section with a first bending curve and an opposing secand wall section with a larger, second bending curve.

In more simple words, the air inlets in this refinement are arranged on or at a wall segment following the smaller bending radius; which corresponds to the situation in which the air inlets are arranged on a side opposite to the larger bending radius. In this case, the air inlet of the first dust separating cyclone adapted for smaller dust particles preferably is arranged before, i.e. upstream, the air inlet of the second dust separating cyclone adapted for larger dust particles or dust particle distributions. In this configuration it can be largely prevented that larger dust particles, generally urged to more extended trajectories, enter the first dust separating cyclone. Note that entering the first dust separating cyclone in this refinement in general requires dust particles to follow comparatively narrow and tight trajectories, whereas entering the second dust separating cyclone is possible with more extended and wide trajectories. One particular advantage of the proposed refinement is that the danger of a comparatively large dust particle entering a dust separating cyclone adapted for comparatively small dust particles, e.g. the first dust separating cyclone, can be minimized.

However, it would be conceivable that the air inlets of the first and second dust separating cyclone are arranged at the side of the second wall section, i.e. the wall section having the larger bend. In this case, the air inlet of the second dust separating cyclone for larger dust particles in general able to follow trajectories with larger bending radii would have to be arranged before, i.e. upstream, the air inlet of the first dust separating cyclone for smaller dust particles in general able to follow trajectories with smaller bending radii. In other words, in a direction of the air-flow, the air inlet of the second dust separator cyclone would be required to be located before the air inlet of the first dust separator cyclone. However, if a comparatively large or heavy particle in this configuration would miss the air inlet for the second dust separating cyclone, it would enter the first dust separating cyclone which, according to the proposed design, would not be adapted to such large or heavy dust particles.

In one further embodiment, the cyclone dust separating arrangement may comprise a dust trap based on the effect of inertia forces. The dust trap may be arranged upstream the first and second dust separating cyclones. Such a dust trap may be used and implemented to separate from the incoming dust laden airflow particles larger or heavier than a predetermined size, volume or mass. In this way, the separating efficiency of the dust separating cyclones, in particular for dust particles sizes to which they may be specifically adapted to, can be enhanced. This enhancement is—inter alia—based on the fact that large, voluminous and/or heavy dust particles can be kept out from the subsequent cyclonic separation processes.

In a preferred variant of the dust trap, it comprises a line segment, in particular a pipe segment or a duct segment, with a turn of at least 45 degrees, preferably 90 degrees. With such line segments, dust particles of comparatively high weight can be separated efficiently. In this variant, it is preferred that a collecting chamber, in particular a chamber for collecting dust particles, is provided at or downstream of an outer apex of the turn. Such a position of the dust collecting chamber is effective for collecting dust particles of comparatively high weight, as such particles in general move towards and along the outer radius of the turn where they will most probably enter the collecting chamber.

In one embodiment it may be that the dust trap is part of the bent section of the air supply channel. In this way a comparatively compact design may be obtained. However, the dust trap can be implemented at any other location of the air ducting leading to the cyclone dust separator arrangement.

In a further embodiment, it may be provided that the air supply channel comprises a straight-lined section located, and preferably spreading, between the bent section of the air supply channel and the air inlets of the first and second dust separating cyclones. A straight-lined section may be advantageous for enhancing the separation efficiency of the inertia particle separator. In particular, such a straight lined section may enhance the spreading range of trajectories for the dust particles passing the inertia particle separator. Further, the design of the straight-lined section may be used to define the cut-off-line or cut-off value between particles intended for the first dust separating cyclone and the second dust separating cyclone more exactly.

It shall be mentioned, that the length of the straight-lined section and the curvature of the bent section may be adapted to respective operational conditions and provisions of a related cyclone dust separator and cyclone vacuum cleaner. In particular an airflow velocity, the diameter of air ductings and other parameters may be relevant and adapted accordingly in order to properly adjust the separation efficiency of the inertia particle separator.

In a further embodiment, the first dust separating cyclone comprises a conical, in particular tapered, cyclone body, and the second dust separating cyclone comprises a cylindrical cyclone body. If, as mentioned further above, the first dust separating cyclone is provided for separating comparatively small dust particles, i.e. constitutes a fine dust separating cyclone, the conical shape is effective in increasing separation efficiency. In connection with comparatively large and heavy dust particles, it has been observed that such particles may get stuck in conical shaped cyclone bodies and hardly or even never become separated. By the way, this may be due to the fact that in conical shaped cyclone bodies a normal force acting from the cyclone body walls has a component reversed to the movement of cyclonic separation. Hence, smaller dust particles can be separated more efficiently in using conical cyclone bodies as proposed before.

Based on the same phenomenon as explained before, larger or comparatively large dust particles can be separated more efficiently in using cyclone bodies with parallel walls, i.e. in cyclone bodies with cylindrical shaped walls. In this case, the normal forces acting from the walls at least do not counteract the movement of cyclonic separation. Therefore using a cylindrical cyclone body for the second dust separating cyclone can raise separation efficiency for the fraction of larger dust particles separated by the inertia particle separator.

As can be seen, pre-separating incoming dust particles according to their size and/or weight by using the proposed inertia particle separator and adapting the shape, in particular geometry, of respective cyclone bodies to the type of respective pre-separated dust particles can greatly enhance the separating efficiency.

In all it becomes clear that the proposed inertia particle separator, in particular acting as a type of dust particle pre-separator, is effective in improving separation efficiency. This in particular is the case with parallel dust separating cyclones—as proposed—which, as an additional advantage, show a reduced pressure drop over the respective separation step.

According to one aspect, a cyclone dust separator is provided, which comprises at least one cyclone dust separator arrangement in any embodiment and variant as proposed beforehand. As to advantages and advantageous effects, reference is made to the description above.

The cyclone dust separator may be adapted such that the cyclone dust separator arrangement is part of a secondary stage cyclone dust separating unit. Secondary stage dust separators may comprise a variety of separating cyclones, and hence a pairwise combination to first and second dust separating cyclones is readily possible.

However, any other combination, in particular a combination of more than two cyclones, may be possible.

Further, in connecting respective two or more of the cyclone separators in parallel, as required for the cyclone dust separator arrangement, can help to significantly reduce the pressure drop over the secondary stage dust separation.

Taken together, improved separation and energy efficiency of the cyclone dust separator may be obtained. Note that the cyclone dust separator arrangement may be implemented even in higher order dust separation stages.

However, it is also or in the alternative possible that the cyclone dust separator arrangement is part of a primary stage cyclone dust separating unit. In particular, the advantages and advantageous effects of enhanced dust separation apply mutatis mutandis.

In one favorable variant it is provided that the primary stage cyclone dust separating unit comprises two parallel cyclone dust separators, i.e. cyclone dust separator units, which are angled apart with a main dust filter being arranged in between. The latter design and arrangement of the primary stage dust separators is advantageous for obtaining a comparatively space saving and compact design of the first separation stage. Further, air guidance, in particular in case of using an inertia particle separator for the first cyclone separating stage, can be configured in favorable ways.

As to further advantages and advantageous effects, reference is made to the description further above and further below.

According to aspect, a cyclone vacuum cleaner is proposed, which comprises at least one cyclone dust separator arrangement as proposed further above, including all embodiments and variants thereof. Similarly, a cyclone vacuum cleaner may comprise at least one cyclone dust separator as proposed above, including all embodiments and variants thereof. As to advantages and advantageous effects, reference is made to the description above.

In an embodiment of the cyclone vacuum cleaner it is provided that it further comprises a pre-separating unit implemented as an inertia dust particle separator with a dust particle collecting chamber. The pre-separating unit preferably is integrated upstream of at least one of a primary stage and secondary stage cyclone dust separating unit.

BRIEF DESCRIPTION OF THE DRAWINGS

Using such a pre-separating unit is advantageous in that comparatively large and/or heavy dust particles, in particular dust particles with comparatively high weight, can be removed from the air stream at an early stage. This in turn may help to enhance separation efficiency of subsequent separation steps, which in particular can be adapted and optimized to particle sizes in the range below the separation cut-off of the pre-separating unit. Here, it shall be mentioned that inertia particle separator of the cyclone dust separator arrangement can be optimized to the type, i.e. average size and average weight, of dust particles passing the pre-separating unit.

From the above description it can be seen, that in particular the proposed cyclone dust separator arrangement is advantageous for optimizing and even improving separation efficiency.

Embodiments of the invention will now be described in connection with the annexed figures, in which.

DETAILED DESCRIPTION

Unless otherwise mentioned, like elements are designated by like reference signs throughout the figures.

Figure 1:
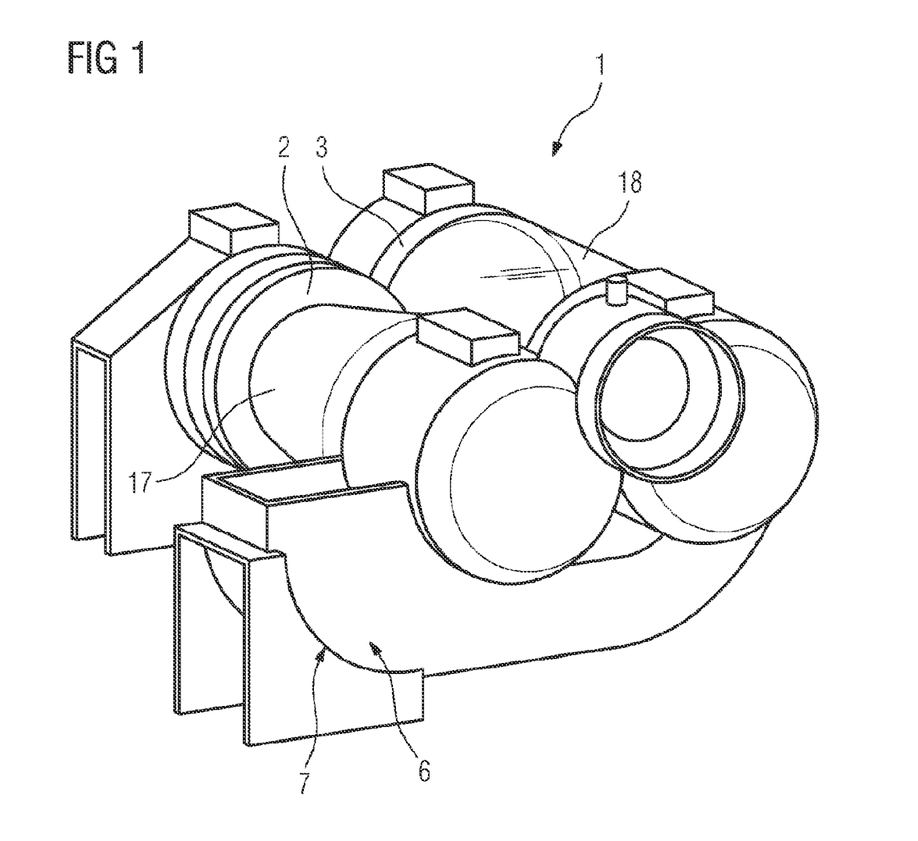
FIG. 1 shows a perspective view of a cyclone dust separator arrangement.
Figure 2:
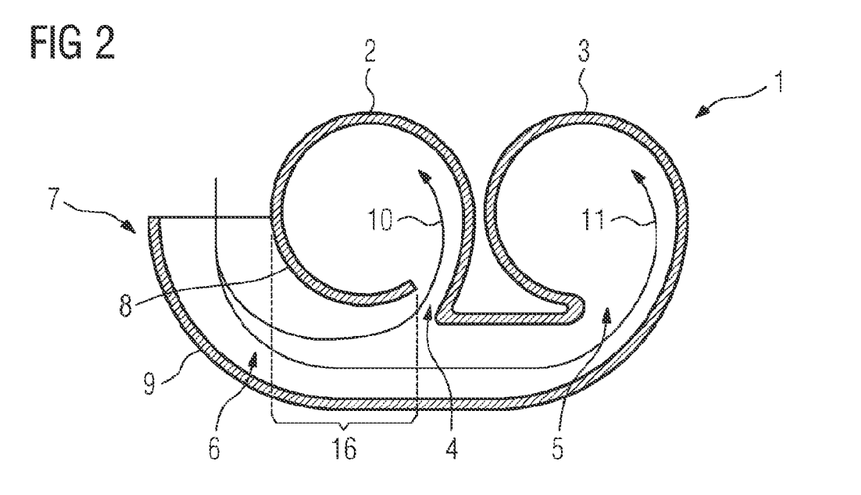
FIG. 2 shows a cross-sectional view of the cyclone dust separator arrangement.

FIG. 1 shows a perspective view of a cyclone dust separator arrangement 1 and FIG. 2 shows a cross-sectional view of the cyclone dust separator arrangement 1.

The cyclone dust separator arrangement 1 comprises a first dust separating cyclone 2 and a second dust separating cyclone 3. As can in particular be seen from FIG. 2, each of the dust separating cyclones comprises an air inlet. The air inlet of the first dust separating cyclone 2 will be designated a first air inlet 4 and the air inlet of the second dust separating cyclone 3 will be designated a second air inlet 5.

The first air inlet 4 and the second air inlet 5 are connected in parallel to a common air supply channel 6. The air supply channel 6 is adapted and designed such that air, in particular dust laden air, sucked in by a suction motor of a respective vacuum cleaner and guided to the air supply channel 6 is and can be distributed to the first 2 and second dust separating cyclone 3. The air supply channel 6 may also be designated an air supply chamber or pre-chamber.

As can be seen in particular from FIG. 2, the air supply channel 6 comprises an inertia particle separator implemented upstream of the first 4 and second air inlet 5. In the present embodiment, the inertia particle separator comprises a bent section 7 in an air-inlet region of the air supply channel 6.

As can in particular be seen from FIG. 2, the inertia particle separator comprises a first wall section 8 having a bending radius smaller than an opposing second wall section 9. The first air inlet 4 and the second air inlet 5 are situated in successive order on a wall segment, in particular a wall segment of the air supply channel 6, arranged downstream and adjacent to the first wall section 8.

In this arrangement as described beforehand, dust particles of different size and/or weight will move along different trajectories. Two exemplary trajectories are indicated in FIG. 2.

A first trajectory 10 is indicated in connection with the first dust separating cyclone 2. This trajectory belongs to a dust particle of comparatively low weight and therefore comparatively small size, whereas a second trajectory 11 indicated in connection with the second dust separating cyclone 3 belongs to a dust particle of comparatively high weight and larger size.

The first trajectory 10 is representative of dust particles that can enter the first dust separating cyclone 2 despite of the inertial particle separator implemented upstream by the bent section 7. Entering the first air inlet 4 of the first dust separating cyclone 2 is possible for comparatively light weight dust particles, as they can move along trajectories with low bending radius at a given airstream. Entering the first air inlet 4 is possible for a certain range of dust particle sizes and mass, which inter alia may depend on the bending radius of the first and second wall sections 8 and 9, the size of the first air inlet 4 and other variables.

With increasing weight of the dust particles, entering the first dust inlet becomes increasingly unlikely, and upon crossing a certain cut-off value, the dust particles will not be able to enter the first air inlet 4 any more. Note that the cut-off value inter alia may depend on the air velocity, the bending radius of the bent section 7, the size of the first air inlet 4 and other parameters.

Dust particles beyond the cut-off value proceed within the air supply channel 6 and will be guided or reach the second air inlet 5, where they will enter and pass the second dust separating cyclone 3. This is indicated by the second trajectory 11.

With the arrangement of the first and second air inlets 4, 5 and the bent section 7, the average weight of dust particles capable of entering the second dust separating cyclone 3 is greater than an average weight of dust particles capable of entering the first dust separating cyclone 2. Therefore, the second dust separating cyclone 3 may be adapted and optimized to separate larger dust particles, whereas the first dust separating cyclone 2 may be adapted and optimized to separate smaller dust particles. With this, the separation efficiency can be greatly be enhanced.

The bent section 7 in the present case comprises a duct segment with a turn of about 90 degrees. It shall be noted, that other angles may be selected according to the expected dust particle distribution, size of the first and second air inlets 4 and 5, distance of the first and second air inlets 4 and 5 from the bent section, air flow velocity and other parameters.

In order to further enhance separation efficiency, a dust trap may be provided in connection with the inertia particle separator, in the present case the bent section 7. Such a dust trap may comprise a dust collecting chamber, preferably for collecting larger dust particles, i.e. dust particles of comparatively high size and/or weight. The dust collecting chamber may for example be implemented downstream of an outer apex of the bent section 7, or at any other suitable location, such as for example at an outer, bent wall section near the second air inlet 5 of the second dust separating cyclone.

Figure 3:
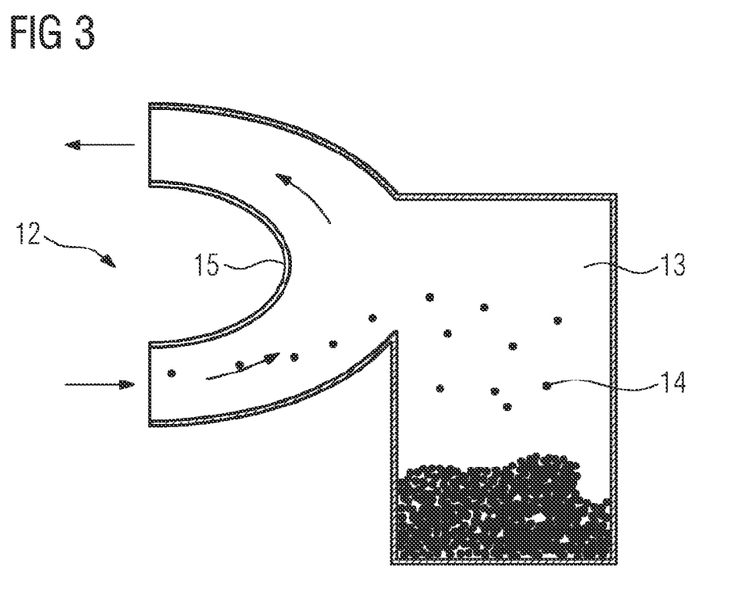
FIG. 3 shows a detail of a dust trap.

An example of such a dust particle trap 12 is shown in FIG. 3. Note that for clarity reasons, respective dust traps 12 which may be implemented as optional elements with the cyclone dust separator arrangement 1 are not shown in FIG. 1 and FIG. 2.

The dust particle trap 12 comprises a dust collecting chamber 13 in which dust particles 14 are collected which are not able to pass a corresponding turn 15 of a respective air duct or air guidance pathway, but instead pass through an entrance opening of the dust collecting chamber 13. Note that an air flow through the turn 15 in FIG. 3 is indicated by arrows.

The particle trap 12 may, as already mentioned, be implemented with the cyclone dust separator arrangement 1. However, it is also possible that the particle trap 12 is implemented in an air ducting upstream the cyclone dust separator arrangement 1, in which case the dust trap 12 may be designated a pre-separating unit.

In any case, such a dust particle trap 12 or also a pre-separation unit may be useful to reduce the average dust particle size entering the cyclone dust separator arrangement 1 or even single dust separating cyclones, such as the first and second dust separating cyclones 2 and 3. Hence, respective cyclones or cyclone units may be optimized to a lowered particle sizes, and by this, the overall separation efficiency may further be enhanced.

As may be observed from FIG. 2 and as already indicated above, the air supply channel 6 may comprise a straight section 16 between the bent section 7 and the first and second air inlet 4 and 5. The length of this straight section 16 may be one of the parameters for defining the cut-off dust particle size/weight between the first and second dust separating cyclone 2 and 3. In particular, within the freedom of design allowed by the general structure of the cyclone dust separator, this length may be selected and adapted according to respective needs, in particular separation efficiency and expected dust particle distribution.

From FIG. 1, a further constructional detail can be derived. It has already been mentioned, that the first dust separating cyclone 2 according to the proposed design will be fed with dust particles with an average size or weight smaller than that of the dust particles fed to the second dust separating cyclone 3. Therefore, the first dust separating cyclone 2 and the second dust separating cyclone 3 are optimized to respective dust particle sizes or weights, in particular respective dust particle distributions.

In connection with optimizing separation efficiency, it is provided that a first cyclone body 17 of the first dust separating cyclone 2 has a conical shape. Conical shapes have been proven to have particular high separation efficiencies for comparatively small dust particles, or in other words for dust particle distributions with comparatively low average dust particle size.

In contrast thereto, a second cyclone body 18 of the second dust separating cyclone 3 has a cylindrical shape. Such a shape has been proven to be optimal for larger dust particles, or in other words for dust particle distributions with larger average dust particle size. One reason for this is, that in conical type cyclone bodies, a normal force acting from the inclined tapering cyclone body wall has a component opposite to the separation force of the cyclone separator. In cylindrical cyclone bodies, such as the second cyclone body 18, respective normal forces are at least not directed in opposite direction of the separation force of the respective cyclone separator. Hence, dust particles prone to get stuck within conical cyclone bodies can readily be separated in cyclones with cylindrical cyclone bodies.

Figure 4:
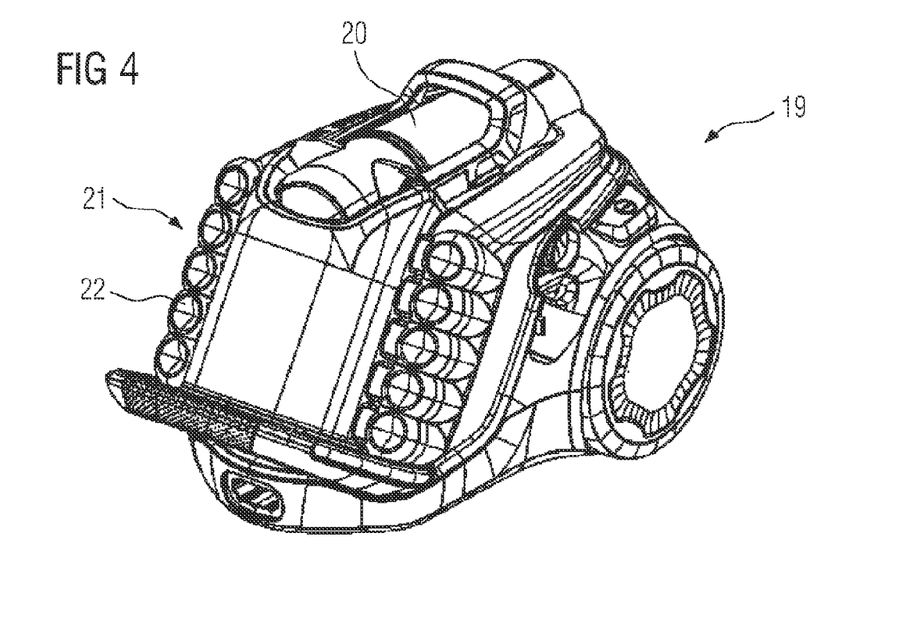
FIG. 4 shows a perspective view of a first configuration of a cyclone vacuum cleaner.

FIG. 4 shows a perspective view of a first configuration of a cyclone vacuum cleaner 19. The cyclone vacuum cleaner 19 comprises a first cyclone separation stage with a first cyclone separation unit 20 and a downstream second cyclone separation unit 21.

The second cyclone separation unit 21 is divided into two subunits respectively arranged at left and right front sides of the vacuum cleaner 19. Each subunit comprises a number of parallel secondary cyclone separators 22. Respectively pairs of two, three or more of the secondary cyclone separators 22 may be combined to implement a cyclone dust separator arrangement 1 as described and shown above, in particular in connection with FIG. 1 and FIG. 2.

In this connection, it shall be mentioned, that the number of parallel cyclones of a dust separator arrangement 1 can be larger than 2. In the present configuration of the vacuum cleaner 19, the dust separator arrangement 1 is part of a secondary dust separating step with a primary dust separating step implemented upstream. In the primary cyclone separation step, comparatively large dust particles can be removed. Therefore, the secondary cyclone stage or step can be optimized to the remaining dust particle distribution in accordance with the process as described in connection with the cyclone dust separator arrangement 1 above. As the separating efficiency of the second dust separation stage can be enhanced, in particular by the cyclone dust separator arrangement 1, the overall dust separation efficiency of the cyclone vacuum cleaner 19 can be enhanced too.

Figure 5:
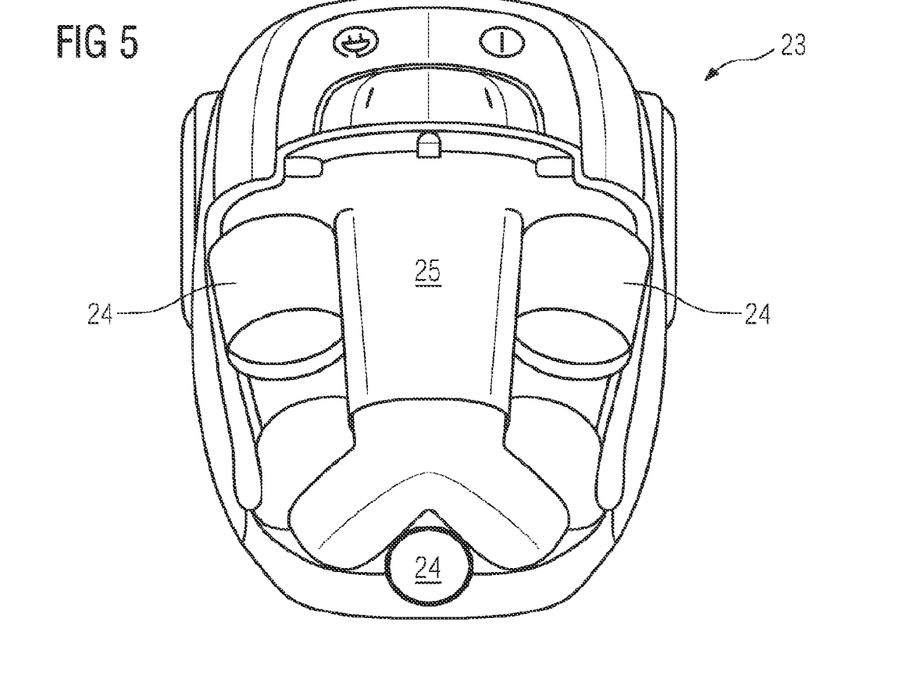
FIG. 5 shows a perspective view of a second configuration of a further cyclone vacuum cleaner.

FIG. 5 shows a perspective view of a second configuration of a further cyclone vacuum cleaner 23. The further cyclone vacuum cleaner 23 comprises at a front section thereof a pair of primary cyclone separators 24 constituting or being part of a primary cyclone dust separating unit. The primary cyclone separators 24 are angled apart in such a way that there is sufficient room or space to place or mount a main dust filter 25 in between.

In the second configuration of the further cyclone vacuum cleaner 23 it is possible to implement the cyclone dust separator arrangement 1 as described further above, in using one of the primary cyclone separators 24 as the first dust separating cyclone 2 and the other one as the second dust separating cyclone 3. A corresponding air supply channel for distributing incoming air and dust particles to respective paths to the first and second dust separating cyclones, respectively, can be implemented in the air inlet ducting 24 or at a location situated further downstream. Note that the geometry and design of the air supply channel in this case may be different from that shown in FIG. 1 and FIG. 2.

As already indicated further above, in particular in connection with FIG. 3, the cyclone vacuum cleaners 19, 23 may comprise as an additional feature, a pre-separating unit implemented as an inertia dust particle separator with a dust particle collecting chamber. The pre-separating unit may be integrated upstream of at least one of the primary stage and secondary stage cyclone dust separating units. Such a pre-separating unit may additionally enhance separating efficiency.

In all, it can be seen, that the proposed cyclone vacuum cleaner, cyclone dust separator and in particular cyclone dust separator arrangement 1 are effective in enhancing separation efficiency of respective cyclone dust separation.

LIST OF REFERENCE NUMERALS 1 cyclone dust separator arrangement
2 first dust separating cyclone
3 second dust separating cyclone
4 first air inlet
5 second air inlet
6 air supply channel
7 bent section
8 first wall section
9 second wall section
10 first trajectory
11 second trajectory
12 dust trap
13 dust collecting chamber
14 dust particle
15 turn
16 straight section
17 first cyclone body
18 second cyclone body
19 cyclone vacuum cleaner 20 first cyclone separation unit
21 second cyclone separation unit
22 secondary cyclone separator
23 further cyclone vacuum cleaner
24 primary cyclone separator
25 main dust filter
26 air inlet ducting
Itemized List Cyclone dust separator arrangement (1) comprising at least one first dust separating cyclone (2) and at least one second dust separating cyclone (3) with respective air inlets (4, 5) being connected in parallel to a common air supply channel (6), wherein the common air supply channel (6) comprises an inertia particle separator (6, 7) implemented upstream of the air inlets (4, 5).

Cyclone dust separator arrangement (1) according to claim 1, wherein the design of the inertia particle separator (6, 7) and the arrangement of the air inlets (4, 5) is adapted such that an average weight of dust particles capable of entering the second dust separating cyclone (3) is greater than an average weight of dust particles capable of entering the first dust separating cyclone (2).

Cyclone dust separator arrangement (1) according to at least one aspect, wherein the inertia particle separator (6, 7) comprises in an air-inlet region of the air supply channel (6) a bent section (7) for deflecting incoming dust particles towards the air inlets (4, 5) of the first and second dust separating cyclones (2, 3) situated downstream the bent section (7) preferably in successive order.

Cyclone dust separator arrangement (1) according to one aspect, wherein the bent section (7) comprises a first wall section (8) with a first bending, radius and an opposing second wall section (9) with a larger, second bending radius, wherein, the air inlets (4, 5) are located at or on a wall segment arranged downstream and adjacent to the first wall section (8).

Cyclone dust separator arrangement (1) according to at least one aspect, further comprising a dust trap (12) based on the effect of inertia forces and arranged upstream the first and second dust separating cyclones (2, 3).

Cyclone dust separator arrangement (1) according to one aspect, wherein the dust trap (12) comprises a line segment with a turn (15) of at least 45 degrees, preferably 90 degrees, wherein a collecting chamber (13) is preferably provided at or downstream of an outer apex of the turn (15).

Cyclone dust separator arrangement (1) according to at least one aspect, wherein the turn (15) of the dust trap (12) is part of the bent section (7) of the air supply channel (6).

Cyclone dust separator arrangement (1) according to at least one aspect, wherein the air supply channel (6) comprises a straight-lined section (16) provided between the bent section (7) and the air inlets (4, 5) of the first and second dust separating cyclones (2, 3).

Cyclone dust separator arrangement (1) according to at least one aspect, wherein the first dust separating cyclone (2) comprises a conical cyclone body (17), and wherein the second dust separating cyclone (3) comprises a cylindrical cyclone body (18).

Cyclone dust separator comprising at least one cyclone dust separator arrangement (1) according to at least one aspect.

Cyclone dust separator (22) according to one aspect, wherein the at least one cyclone dust separator arrangement (1) is part of a secondary stage cyclone dust separating unit (22).

Cyclone dust separator according to one aspect, wherein the cyclone dust separator arrangement (1) is part of a primary stage cyclone dust separating unit (24), preferably comprising two parallel cyclone dust separators (24) angled apart with a main dust filter (25) being arranged in between.

Cyclone vacuum cleaner (19, 23) comprising at least one cyclone dust separator arrangement (1) according to at least one aspect.

Cyclone vacuum cleaner (19, 23) comprising at least one cyclone dust separator according to at least one aspect.

Cyclone vacuum cleaner (19, 23) according to at least one aspect, further comprising a pre-separating unit (12) implemented as an inertia dust particle separator with a dust particle collecting chamber (13), wherein the pre-separating unit (12) is integrated upstream of at least one of a primary stage (20, 24) and secondary stage cyclone dust separating unit (22).

The invention claimed is:

1. A cyclone dust separator arrangement comprising at least one first dust separating cyclone having a first air inlet and at least one second dust separating cyclone having a second air inlet, the first air inlet and the second air inlet being connected in parallel to a common air supply channel, wherein the common air supply channel comprises an inertia particle separator located upstream of the first air inlet and the second air inlet, and wherein the inertia particle separator, the first air inlet and the second air inlet are configured such that particles are separated in accordance to their weight, such that an average weight of dust particles capable of entering the second dust separating cyclone through the second air inlet is greater than an average weight of dust particles capable of entering the first dust separating cyclone through the first air inlet; wherein the inertia particle separator comprises, in an air-inlet region of the air supply channel, a bent section for deflecting incoming dust particles towards the first air inlet and the second air inlet situated downstream of the bent section, with the first air inlet being upstream of the second air inlet.

2. The cyclone dust separator arrangement according to claim 1, wherein the bent section comprises a first wall section with a first bending radius and an opposing second wall section with a larger, second bending radius, wherein, the first air inlet and the second air inlet are located at or on a wall segment arranged downstream and adjacent to the first wall section.

3. The cyclone dust separator arrangement according claim 1, further comprising a dust trap positioned upstream of the first dust separating cyclone and the second dust separating cyclone to receive dirt separated by the inertia particle separator.

4. The cyclone dust separator arrangement according to claim 3, wherein the dust trap comprises a line segment with a turn of at least 45 degrees, wherein a collecting chamber is preferably provided at or downstream of an outer apex of the turn.

5. The cyclone dust separator arrangement according to claim 4, wherein the turn of the dust trap is part of the bent section of the air supply channel.

6. The cyclone dust separator arrangement according to claim 1, wherein the air supply channel comprises a straight-lined section provided between the bent section and the first air inlet and the second air inlet.

7. The cyclone dust separator arrangement according to claim 1, wherein the first dust separating cyclone comprises a conical cyclone body, and wherein the second dust separating cyclone comprises a cylindrical cyclone body.

8. A cyclone dust separator comprising at least one cyclone dust separator arrangement according to claim 1.

9. The cyclone dust separator according to claim 8, wherein the at least one cyclone dust separator arrangement is part of a secondary stage cyclone dust separating unit.

10. The cyclone dust separator according to claim 8, wherein the cyclone dust separator arrangement is part of a primary stage cyclone dust separating unit.

11. A vacuum cleaner comprising at least one cyclone dust separator arrangement according to claim 1.

12. A vacuum cleaner according to claim 11, wherein the at least one cyclone dust separator arrangement is part of a secondary stage cyclone dust separating unit.

13. The cyclone dust separator arrangement according to claim 4, wherein the dust trap comprises a line segment with a turn of 90 degrees.

14. The cyclone dust separator according to claim 10, wherein the cyclone dust separator arrangement is part of a primary stage cyclone dust separating unit comprising two parallel cyclone dust separators angled apart with a main dust filter being arranged between the two parallel cyclone dust separators.

\* \* \* \* \*